US012278968B2

(12) United States Patent
Pettersson et al.

(10) Patent No.: US 12,278,968 B2
(45) Date of Patent: Apr. 15, 2025

(54) PROVIDING SEGMENT PRESENCE INFORMATION

(71) Applicant: Telefonaktiebolaget LM Ericsson (publ), Stockholm (SE)

(72) Inventors: Martin Pettersson, Vallentuna (SE); Rickard Sjöberg, Stockholm (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 397 days.

(21) Appl. No.: 17/762,011

(22) PCT Filed: Aug. 19, 2020

(86) PCT No.: PCT/SE2020/050800
§ 371 (c)(1),
(2) Date: Mar. 18, 2022

(87) PCT Pub. No.: WO2021/061035
PCT Pub. Date: Apr. 1, 2021

(65) Prior Publication Data
US 2022/0368922 A1  Nov. 17, 2022

Related U.S. Application Data

(60) Provisional application No. 62/904,093, filed on Sep. 23, 2019.

(51) Int. Cl.
*H04N 19/14* (2014.01)
*H04N 19/169* (2014.01)
(Continued)

(52) U.S. Cl.
CPC .......... *H04N 19/14* (2014.11); *H04N 19/188* (2014.11); *H04N 19/70* (2014.11); *H04N 19/89* (2014.11)

(58) Field of Classification Search
CPC .... H04N 19/119; H04N 19/14; H04N 19/184; H04N 19/188; H04N 19/31; H04N 19/70;
(Continued)

(56) References Cited

U.S. PATENT DOCUMENTS

2014/0355692 A1  12/2014  Ramasubramonian et al.
2016/0191931 A1   6/2016  Hannuksela
(Continued)

FOREIGN PATENT DOCUMENTS

CN  105556975 A  5/2016
CN  107743236 A  2/2018
(Continued)

OTHER PUBLICATIONS

Pettersson et al. ("AHG17: Signaling absence of NAL unit types in DPS", Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0366) (Year: 2019).*
(Continued)

*Primary Examiner* — Maria E Vazquez Colon
(74) *Attorney, Agent, or Firm* — Rothwell, Figg, Ernst & Manbeck, P.C.

(57) ABSTRACT

There are provided mechanisms performed by a decoder. The method comprises receiving a bitstream. The method comprises processing the received bitstream, wherein: the bitstream comprises a first part of the bitstream, and the first part of the bitstream provides segment presence information, and further wherein i) the segment presence information indicates that at least segments of a first segment type shall not be present in at least a portion of the bitstream, or ii) the segment presence information indicates that at least segments of the first segment type may be present in at least the portion of the bitstream.

18 Claims, 8 Drawing Sheets

(51) Int. Cl.
*H04N 19/70* (2014.01)
*H04N 19/89* (2014.01)

(58) Field of Classification Search
CPC .. H04N 19/89; H04N 21/2343; H04N 21/235; H04N 21/435; H04N 21/845
See application file for complete search history.

(56) References Cited

U.S. PATENT DOCUMENTS

| | | | |
|---|---|---|---|
| 2016/0261878 | A1 | 9/2016 | Deshpande |
| 2018/0278964 | A1 | 9/2018 | Wang et al. |
| 2020/0389655 | A1* | 12/2020 | Seregin ............... H04N 19/174 |
| 2021/0136419 | A1* | 5/2021 | Hsiang ............... H04N 19/174 |
| 2021/0227231 | A1* | 7/2021 | Hannuksela ........... H04N 19/46 |

FOREIGN PATENT DOCUMENTS

| | | |
|---|---|---|
| EP | 3349467 A1 | 7/2018 |
| WO | 2013/163563 A1 | 10/2013 |
| WO | 2014/106651 A1 | 7/2014 |
| WO | 2016/057884 A1 | 4/2016 |
| WO | 2016098056 A1 | 6/2016 |
| WO | 2018/146376 A1 | 8/2018 |
| WO | 2020/130910 A1 | 6/2020 |
| WO | 2020/141258 A1 | 7/2020 |
| WO | 2020/183053 A1 | 9/2020 |

OTHER PUBLICATIONS

International Search Report and Written Opinion dated Nov. 6, 2020 in International Application No. PCT/SE2020/050800 (14 pages).
International Preliminary Report on Patentability dated Dec. 6, 2021n International Application No. PCT/SE2020/050800 (14 pages).
Drugeon, V., "AHG17: Presence of Video Parameter Set in bitstreams", oint Video Experts Team (JVET) of ITU-T SG 16 WP 3 and ISO/IEC JTC 1/SC 29/WG 11, 16th meeting: Geneva, CH, Oct. 1-11, 2019, Document JVET-P0205 (4 pages).
Bross, B., et al., "Versatile Video Coding (Draft 6)", Document JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019 (455 pages).
Pettersson, M., et al., "AHG17: Dependent random access point pictures in VVC", Document: JVET-N0494-v3, Joint Video Experts Team (JVET) of ITU-T SG 16 WP 3 and ISO/IEC JTC 1/SC 29/WG 11, 14th Meeting: Geneva, CH, Mar. 19-27, 2019 (8 pages).
Sharman, K., et al., "AHG 5 and 18: Profiles for Range Extensions", JCTVC-O0082, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013 (JCTVC-O0082) (12 pages).
Sjöberg, R., et al., "AHG17: An STSA_NUT restriction on PPS and APS availability", JVET-P0359-v3, Joint Video Experts Team (JVET) of ITU-T SG 16 WP 3 and ISO/IEC JTC 1/SC 29/WG 11, 16th Meeting: Geneva, CH, Oct. 1-11, 2019 (7 pages).
Pettersson, M., et al., "AHG17: Signaling absence of NAL unit types in DPS", JVET-P0366, Joint Video Experts Team (JVET) of ITU-T SG 16 WP 3 and ISO/IEC JTC 1/SC 29/WG 11, 16th Meeting: Geneva, CH, Oct. 1-11, 2019 (4 pages).
Pettersson, M., et al., "AHG17: On NAL unit type table", JVET-P0363-v2, Joint Video Experts Team (JVET) of ITU-T SG 16 WP 3 and ISO/IEC JTC 1/SC 29/WG 11, 16th Meeting: Geneva, CH, Oct. 1-11, 2019 (6 pages).
Sony, "AHG 5 and 18: Profiles for Range Extensions," Input Document to JCT-VC, JCTVC-O0082, Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013 (12 pages).

* cited by examiner

PROVIDING SEGMENT PRESENCE INFORMATION

CROSS REFERENCE TO RELATED APPLICATIONS

This application is a 35 U.S.C. § 371 National Stage of International Patent Application No. PCT/SE2020/050800, filed Aug. 19, 2020, which claims priority to U.S. provisional application No. 62/904,093, filed on Sep. 23, 2019. The above identified applications are incorporated by reference.

TECHNICAL FIELD

This disclosure relates to video coding and decoding.

BACKGROUND

1. HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on a block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VVC). At the time of writing, the current version of the VVC draft specification was "Versatile Video Coding (Draft 6)", JVET-O2001-vE. When VVC is referred in this document it refers to the Draft 6 of the VVC specification.

2. Components

A video sequence consists of a series of pictures where each picture consists of one or more components. Each component can be described as a two-dimensional rectangular array of sample values. It is common that a picture in a video sequence consists of three components: one luma component (Y) where the sample values are luma values, and two chroma components (Cb) and (Cr), where the sample values are chroma values. It is common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components. In this document, we describe methods useful for the encoding and decoding of video sequences. However, it should be understood that the techniques described can also be used for encoding and decoding of still images.

3. Blocks and Units

A block is a two-dimensional array of samples. In video coding, each component is split into one or more blocks and the coded video bitstream is a series of blocks.

It is common in video coding that the picture is split into units that cover a specific area. Each unit consists of all blocks that make up that specific area and each block belongs fully to only one unit. The coding unit (CU) in HEVC and VVC is an example of such a unit. A coding tree unit (CTU) is a logical unit which can be split into several CUs.

In HEVC, CUs are squares, i.e., they have a size of N×N luma samples, where N can have a value of 64, 32, 16 or 8. In the current H.266 test model Versatile Video Coding (VVC), CUs can also be rectangular, i.e. have a size of N×M luma samples where N is different to M.

4. NAL Units

Both HEVC and VVC define a Network Abstraction Layer (NAL). All the data, i.e. both Video Coding Layer (VCL) or non-VCL data in HEVC and VVC is encapsulated in a NAL unit. A VCL NAL unit contains data that represents picture sample values. A non-VCL NAL unit contains additional associated data such as parameter sets and supplemental enhancement information (SEI) messages. The NAL unit in HEVC and the current version of VVC begins with a header called the NAL unit header. The syntax for the NAL unit header for HEVC is shown in table 1 and starts with a forbidden_zero_bit that shall always be equal to 0 to prevent start code emulations. Without it, some MPEG systems might confuse the HEVC video bitstream with other data, but the 0 bit in the NAL unit header makes all possible HEVC bitstreams uniquely identifiable as an HEVC bitstream. The nal_unit_type, nuh_layer_id and nuh_temporal_id_plus1 code words specify the NAL unit type of the NAL unit which identifies what type of data is carried in the NAL unit, the layer ID, and the temporal ID for which the NAL unit belongs to, respectively. The NAL unit type indicates and specifies how the NAL unit should be parsed and decoded. The NAL unit header in the current version of VVC is very similar to the one in HEVC, but uses 1 bit less for the nal_unit_type and instead reserves this bit for future use.

The rest of the bytes of the NAL unit is payload of the type indicated by the NAL unit type. A bitstream consists of a series of concatenated NAL units.

TABLE 1

| HEVC NAL unit header syntax | |
|---|---|
| | Descriptor |
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

TABLE 1

| NAL unit header syntax of the current version of VVC | |
|---|---|
| | Descriptor |
| nal_unit_header( ) { | |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

A decoder or bitstream parser can conclude how the NAL unit should be handled, e.g. parsed and decoded, after looking at the NAL unit header. The rest of the bytes of the NAL unit is payload of the type indicated by the NAL unit type. A bitstream consists of a series of concatenated NAL units.

The NAL unit type indicates and defines how the NAL unit should be parsed and decoded. A VCL NAL unit provides information about the picture type of the current picture. The NAL unit types of the current version of the VVC draft are shown in table 3.

The decoding order is the order in which NAL units shall be decoded, which is the same as the order of the NAL units within the bitstream. The decoding order may be different from the output order, which is the order in which decoded pictures are to be output, such as for display, by the decoder.

and 2. Then removing all layer 2 NAL units or removing all layer 1 and 2 NAL units will result in bitstreams that can be decoded without problems. This is ensured by restrictions in the HEVC/VVC specification that the encoder must comply with. For instance, it is not allowed for a picture of a temporal layer to reference a picture of a higher temporal layer.

6. Layers, Dependent and Independent Layers

Layers are defined in VVC as a set of VCL NAL units that all have a particular value of nuh_layer_id and the associated non-VCL NAL units.

A layer access unit in VVC is defined as a set of NAL units for which the VCL NAL units all have a particular value of nuh_layer_id, that are associated with each other

TABLE 3

NAL unit types in the current version of the VVC draft

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RASL_NUT | Coded slice of a RASL picture slice_layer_rbsp( ) | VCL |
| 3 | RADL_NUT | Coded slice of a RADL picture slice_layer_rbsp( ) | VCL |
| 4 . . . 7 | RSV_VCL_4 . . . RSV_VCL_7 | Reserved non-IRAP VCL NAL unit types | VCL |
| 8 | IDR_W_RADL | Coded slice of an IDR picture | VCL |
| 9 | IDR_N_LP | slice_layer_rbsp( ) | |
| 10 | CRA_NUT | Coded slice of a CRA picture silce_layer_rbsp( ) | VCL |
| 11 | GDR_NUT | Coded slice of a GDR picture slice_layer_rbsp( ) | VCL |
| 12 | RSV_IRAP_VCL12 | Reserved IRAP VCL NAL unit types | VCL |
| 13 | RSV_IRAP_VCL13 | | |
| 14 . . . 15 | RSV_VCL14 . . . RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 | DPS_NUT | Decoding parameter set decoding_parameter_set_rbsp( ) | non-VCL |
| 25 . . . 27 | RSV_NVCL25 . . . RSV_NVCL27 | Reserved non-VCL NAL unit types | non-VCL |
| 28 . . . 31 | UNSPEC28 . . . UNSPEC31 | Unspecified non-VCL NAL unit types | non-VCL |

Temporal Layers

In HEVC and in the current version of VVC, all pictures are associated with a TemporalId value which specifies the temporal layer to which the picture belongs. TemporalId values are decoded from the nuh_temporal_id_plus1 syntax element in the NAL unit header. In HEVC, the encoder is required to set TemporalId values such that pictures belonging to a lower layer are perfectly decodable when higher temporal layers are discarded. Assume for instance that an encoder has output a bitstream using temporal layers 0, 1 according to a specified classification rule, that are consecutive in decoding order, and that contain exactly one coded picture.

A coded layer video sequence (CLVS) in the current version of VVC is defined as a sequence of layer access units (LAUs) that consists, in decoding order, of a CLVS layer access unit, followed by zero or more layer access units that are not CLVS layer access units, including all subsequent layer access units up to but not including any subsequent layer access unit that is a CLVS layer access unit.

The relation between the layer access units and coded layer video sequences is illustrated FIG. 5.

In the current version of VVC, layers may be coded independently or dependently from each other. When the layers are coded independently, a layer with e.g. nuh_layer_id 0 may not predict video data from another layer with e.g. nuh_layer_id 1. In the current version of VVC, dependent coding between layers may be used, which enables support for scalable coding with SNR, spatial and view scalability.

7. Access Units and the Access Unit Delimiter

For single layer coding in HEVC and the current VVC draft, an access unit (AU) is the coded representation of a single picture. An AU may consist of several video coding layer (VCL) NAL units as well as non-VCL NAL units. An access unit, in the current version of VVC, must start with an access unit delimiter (AUD) NAL unit which indicates the start of the access unit and the type of the slices allowed in the picture, i.e. I, I-P or I-P-B. In HEVC, it is optional for an AU to start with an AUD. The syntax and semantics for the access unit delimiter NAL unit in the current version of the VVC draft is shown below.

TABLE 2

Access unit delimiter raw byte sequence payload (RBSP) syntax in the current version of the VVC draft

| | Descriptor |
|---|---|
| access_unit_delimiter_rbsp( ) { | |
|   pic_type | u(3) |
|   rbsp_trailing_bits( ) | |
| } | |

7.1 Access Unit Delimiter RBSP Semantics

The access unit delimiter is used to indicate the start of an access unit and the type of slices present in the coded pictures in the access unit containing the access unit delimiter NAL unit. There is no normative decoding process associated with the access unit delimiter.

pic_type indicates that the slice_type values for all slices of the coded pictures in the access unit containing the access unit delimiter NAL unit are members of the set listed in table 5 for the given value of pic_type. The value of pic_type shall be equal to 0, 1 or 2 in bitstreams conforming to this version of this Specification. Other values of pic_type are reserved for future use by ITU-T|ISO/IEC. Decoders conforming to this version of this Specification shall ignore reserved values of pic_type.

TABLE 5

Interpretation of pic_type

| pic_type | slice_type values that may be present in the coded picture |
|---|---|
| 0 | I |
| 1 | P, I |
| 2 | B, P, I |

8. Intra Random Access Point (IRAP) Pictures and the Coded Video Sequence (CVS)

An intra random access point (IRAP) picture in HEVC is a picture that does not refer to any pictures other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture and the clean random access (CRA) picture.

A coded video sequence (CVS) in HEVC is a series of access units starting at an IRAP access unit up to, but not including the next IRAP access unit in decoding order.

IDR pictures always start a new CVS. An IDR picture may have associated random access decodable leading (RADL) pictures. An IDR picture does not have associated random access skipped leading (RASL) pictures.

A BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft, a CVS is started at a CVS start (CVSS) access unit, which may contain an IRAP picture, i.e, an IDR or a CRA picture, or a gradual decoding refresh (GDR) picture.

GDR pictures are essentially used for random access in bitstreams encoded for low-delay coding where a full IRAP picture would cause too much delay. A GDR picture may use gradual intra refresh that updates the video picture by picture where each picture is only partially intra coded. It is signaled with the GDR picture when the video is fully refreshed and ready for output, given that the bitstream was tuned into at the GDR picture. A GDR may start a CVS.

9. The STSA Picture

In HEVC (and in the current VVC draft), there is a picture type called the step-wise temporal sub-layer access (STSA) picture. There are two types of STSA pictures in HEVC, STSA_R which is an STSA picture that is also a reference picture and STSA_N which is an STSA picture that is a non-reference picture. In the current VVC draft only one type of STSA picture is specified, and no distinction is made whether the STSA picture is a reference or non-reference picture.

The STSA picture is intended to indicate a position in the bitstream where it is possible to switch up from a lower temporal layer to a higher temporal layer. For example, a decoder may decode temporal layer N which means that all NAL units with a TemporalId equal to or lower than N are decoded and all NAL units with a TemporalId higher than N are ignored. If there is an STSA picture having a TemporalId of N+1, the decoder is ensured to be able to decode that STSA picture and all NAL units that follow the STSA picture in decoding order having a TemporalId equal to or lower than N+1.

10. Supplemental Enhancement Information (SEI) Messages

SEI messages provides information that may be useful for the decoder but is not necessary for the decoding process. The current version of VVC specifies the following SEI messages:

TABLE 6

SEI messages in the current version of VVC

| | Descriptor |
|---|---|
| sei_payload( payloadType, payloadSize ) { | |
|   if( nal_unit_type = = PREFIX_SEI_NUT ) | |
|     if( payloadType = = 0 ) | |
|       buffering_period( payloadSize ) | |
|     else if( payloadType = = 1 ) | |
|       pic_timing( payloadSize ) | |
|     else if( payloadType = = 130 ) | |
|       decoding_unit_info( payloadSize ) | |
|     else if( payloadType = = 145 ) | |
|       dependent_rap_indication( payloadSize ) | |
|         // Specified in ITU-T H.SEI \| ISO/IEC 23002-7. | |
|     else if( payloadType = = 168 ) | |
|       frame_field_info( payloadSize ) | |
|     Else | |
|       reserved_sei_message( payloadSize ) | |
|   else /* nal_unit_type = = SUFFIX_SEI_NUT */ | |
|     if( payloadType = = 132 ) | |
|       decoded_picture_hash( payloadSize ) | |
|         // Specified in ITU-T H.SEI \| ISO/IEC 23002-7. | |
|     Else | |
|       reserved_sei_message( payloadSize ) | |
|   if( more_data_in_payload( ) ) { | |
|     if( payload_extension_present( ) ) | |
|       reserved_payload_extension_data | u(v) |
|     payload_bit_equal_to_one /* equal to 1 */ | f(1) |
|     while( !byte_aligned( ) ) | |
|       payload_bit_equal_to_zero /* equal to 0 */ | f(1) |
|   } | |
| } | |

10.1 Dependent RAP Indication SEI Message

The dependent RAP indication SEI message is used to mark pictures as dependent random access point (DRAP) pictures in the bitstream. The presence of the DRAP indication SEI message indicates that the constraints on picture order and picture referencing specified in this subclause apply. These constraints can enable a decoder to properly decode the DRAP picture and the pictures that follow it in both decoding order and output order without needing to decode any other pictures except the associated IRAP picture.

The constraints indicated by the presence of the DRAP indication SEI message are as follows:

a) The DRAP picture shall be a trailing picture.
b) The DRAP picture shall have a temporal sublayer identifier equal to 0.
c) The DRAP picture shall not include any pictures in the active entries of its reference picture lists except the preceding IRAP picture in decoding order.
d) Any picture that follows the DRAP picture in both decoding order and output order shall not include, in the active entries of its reference picture lists, any picture that precedes the DRAP picture in decoding order or output order, with the exception of the preceding IRAP picture in decoding order.

In VVC reference picture lists (RPLs) are signaled for a current picture to indicate which previously decoded pictures the decoder should keep for reference for decoding the current and future pictures. There are two RPLs for each picture. For inter-prediction only from one picture (P-prediction) only the first RPL is used and for inter-prediction from two pictures (B-prediction) both the first and the second RPLs is used. That an entry is active in a RPL means that the reference picture in the entry is used to decode the current picture. If the reference picture in an entry is not going to be used to predict the current picture but used to predict a later picture, the entry should be kept in the RPL but inactive in the RP of the current picture.

11. Parameter Sets

HEVC and VVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs, e.g. data for multiple layers in the bitstream.

The current version of VVC also specifies two additional parameter sets, the adaptation parameter set (APS) and the decoder parameter set (DPS).

11.1 Adaptation Parameter Set (APS)

APSs comprises a comparable large amount of data compared to the other parameter set. The idea of the APS is to not have to repeat certain groups of data in the slice header for data that may not change very often between slices and pictures, but still frequently enough to not fit well in the SPS or the PPS. In the current version of VVC, there are three types of APSs. One APS type that carries parameters needed for the adaptive loop filter (ALF) coding tool, a second APS type that carries parameters needed for the the luma mapping and chroma scaling (LMCS) coding tool and a third APS type used to carry scaling list parameters. A scaling list is a list that associates each frequency index with a scale factor for the scaling process.

11.2 Decoding Parameter Set (DPS)

DPS specifies information that may not change during the decoding session and may be good for the decoder to know about, e.g. the maximum number of allowed sub-layers. The information in DPS is not necessary for operation of the decoding process.

The decoder parameter set also contains a set of general constraints for the bitstream, that gives the decoder information of what to expect from the bitstream. In the current version of VVC, the general constraint info could also be signaled in VPS:

| | Descriptor |
|---|---|
| general_constraint_info | |
|   general_progressive_source_flag | u(1) |
|   general_interlaced_source_flag | u(1) |
|   general_non_packed_constraint_flag | u(1) |
|   general_frame_only_constraint_flag | u(1) |
|   intra_only_constraint_flag | u(1) |
|   max_bitdepth_constraint_idc | u(4) |
|   max_chroma_format_constraint_idc | u(2) |
|   frame_only_constraint_flag | u(1) |
|   no_qtbtt_dual_tree_intra_constraint_flag | u(1) |
|   no_partition_constraints_override_constraint_flag | u(1) |
|   no_sao_constraint_flag | u(1) |
|   no_alf_constraint_flag | u(1) |
|   no_joint_cbcr_constraint_flag | u(1) |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   no_dmvr_constraint_flag | u(1) |
|   no_cclm_constraint_flag | u(1) |
|   no_mts_constraint_flag | u(1) |
|   no_sbt_constraint_flag | u(1) |
|   no_affine_motion_constraint_flag | u(1) |
|   no_bcw_constraint_flag | u(1) |
|   no_ibc_constraint_flag | u(1) |
|   no_ciip_constraint_flag | u(1) |
|   no_fpel_mmvd_constraint_flag | u(1) |
|   no_triangle_constraint_flag | u(1) |
|   no_ladf_constraint_flag | u(1) |

-continued

| | Descriptor |
|---|---|
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| while( !byte_aligned( ) ) | |
|    gci_alignment_zero_bit | f(1) |
| } | |

SUMMARY

Certain challenges exist. For example, in the current version of VVC it is not possible to indicate in advance whether NAL units with a certain NAL unit type may be present in the bitstream. In addition, it is not possible to indicate in advance whether certain SEI messages may be present in the bitstream. The decoder must then be prepared to handle any type of NAL unit type and SEI message. For some of the NAL unit types and SEI messages the decoder may need to consume some resources in the event that these NAL unit types and SEI messages appear in the bitstream, e.g. allocate memory in advance, storing certain data, parsing certain parts of the bitstream. If these NAL unit types or SEI messages do not appear in the bitstream, then these resources have been consumed unnecessarily.

This disclosure provides a solution. For example, in one specific embodiment it is proposed that a parameter (e.g. a flag) is included in a parameter set (e.g. DPS, VPS, SPS or PPS) and that this parameter specifies whether or not a segment (e.g., a NAL unit or an SEI message) of type A may or may not be present in the bitstream. Accordingly, the flag is one example of segment presence information.

According to a first aspect of the present disclosure there is provided a method performed by a decoder. The method comprises receiving a bitstream. The method comprises processing the received bitstream, wherein: the bitstream comprises a first part of the bitstream, and the first part of the bitstream provides segment presence information, and further wherein i) the segment presence information indicates that at least segments of a first segment type shall not be present in at least a portion of the bitstream, or ii) the segment presence information indicates that at least segments of the first segment type may be present in at least the portion of the bitstream.

According to a second aspect of the present disclosure, there is provided a method performed by an encoder. The method comprises generating a bitstream, wherein the bitstream comprises a first part of the bitstream, and the first part of the bitstream provides segment presence information, and further wherein i) the segment presence information indicates that at least segments of a first segment type shall not be present in at least a portion of the bitstream, or ii) the segment presence information indicates that at least segments of the first segment type may be present in at least the portion of the bitstream.

According to a third aspect of the present disclosure, there is provided a computer program comprising instructions which when executed by processing circuitry causes the processing circuitry to perform the method of any one of the first or the second aspects.

According to a fourth aspect of the present disclosure, there is provided a carrier containing the computer program according to the third aspect, wherein the carrier is one of an electronic signal, an optical signal, a radio signal, and a computer readable storage medium.

According to a fifth aspect of the present disclosure, there is provided a decoding apparatus adapted to perform the method according to the first aspect.

According to a sixth aspect of the present disclosure, there is provided an encoding apparatus adapted to perform the method according to the second aspect.

Advantages

The information as to whether a segment (e.g., a NAL unit, an SEI message, etc,) of type A may or may not be present in the bitstream (segment presence information), is useful for the decoder to know, e.g. to not have to allocate memory that is anyway not going to be used, or to not have to parse certain parts of the bitstream. Thus, an advantage is that the decoder will not allocate resources for NAL unit types, picture types, and SEI messages that may not appear in the bitstream.

For instance, if the decoder knows that no STSA picture is to be expected in the bitstream, it does not need to store PPSs or even scan temporal layers for STSA pictures. It can simply ignore the higher layers that are not being decoded. Another example is the DRAP SEI message. If the decoder knows it will not encounter any DRAP SEI message in the bitstream, it does not need to store IRAP pictures for a channel it may later want to tune into using DRAP pictures.

DETAILED DESCRIPTION

Figure 1:
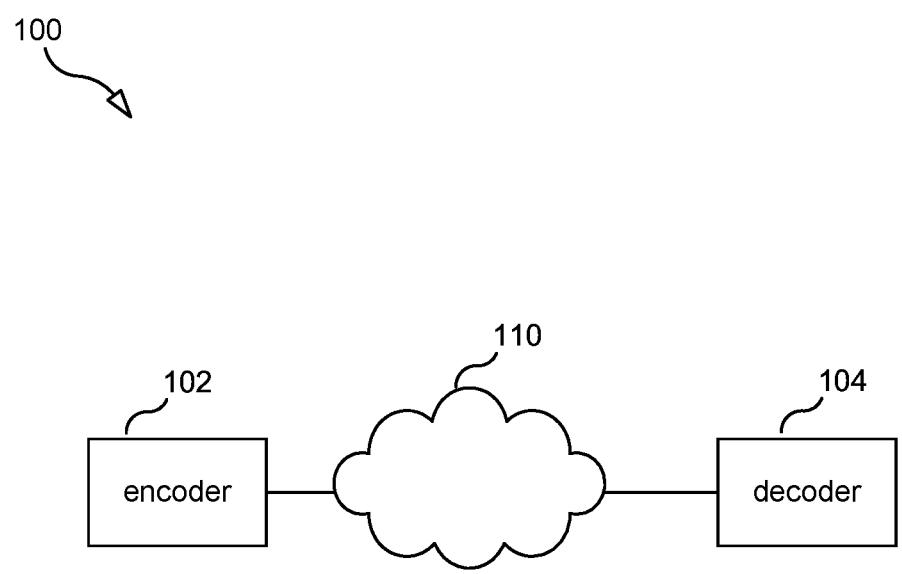
FIG. 1 illustrates a system according to an embodiment.

FIG. 1 illustrates a system 100 according to an example embodiment. System 200 includes an encoder 202 in communication with a decoder 204 via a network 110 (e.g., the Internet or other network). Deblocking may be performed in both encoder 202 and decoder 204. The embodiments described herein can be used in video encoder 102 or video decoder 104.

Figure 2:
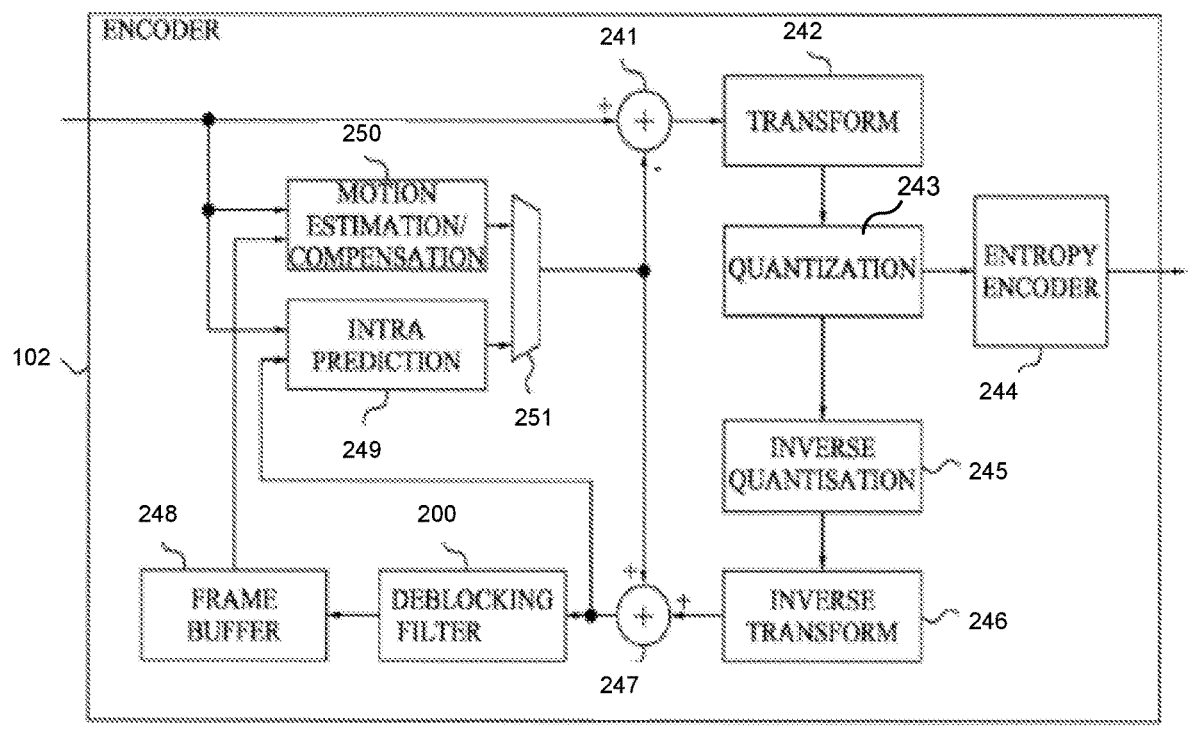
FIG. 2 is a schematic block diagram of a video encoder according to one embodiment.

FIG. 2 is a schematic block diagram of a video encoder 102 according to one embodiment. A current block of pixels is predicted by performing a motion estimation using motion estimator 250 from an already provided block of pixels in the same frame or in a previous frame. The result of the motion estimation is a motion or displacement vector associated with the reference block, in the case of inter prediction. The motion vector may be used by motion compensator 250 to output an inter prediction of the block of pixels. Intra predictor 249 computes an intra prediction of the current block of pixels. The outputs from the motion estimator/ compensator 250 and the intra predictor 249 are input in selector 251 that either selects intra prediction or inter prediction for the current block of pixels. The output from the selector 251 is input to an error calculator in the form of adder 241 that also receives the pixel values of the current block of pixels. Adder 241 calculates and outputs a residual error as the difference in pixel values between the block of pixels and its prediction. The error is transformed in transformer 242, such as by a discrete cosine transform, and quantized by quantizer 243 followed by coding in encoder 244, such as by entropy encoder. In inter coding, also the estimated motion vector is brought to encoder 244 to generate the coded representation of the current block of pixels. The transformed and quantized residual error for the current block of pixels is also provided to an inverse quantizer 245 and inverse transformer 246 to retrieve the original residual error. This error is added by adder 247 to the block prediction output from the motion compensator 250 or intra predictor 249 to create a reference block of pixels that can be used in the prediction and coding of a next block of pixels. This new reference block is first processed by a deblocking filter 200. The processed new reference block is then temporarily stored in frame buffer 248, where it is available to intra predictor 249 and motion estimator/compensator 250.

Figure 3:
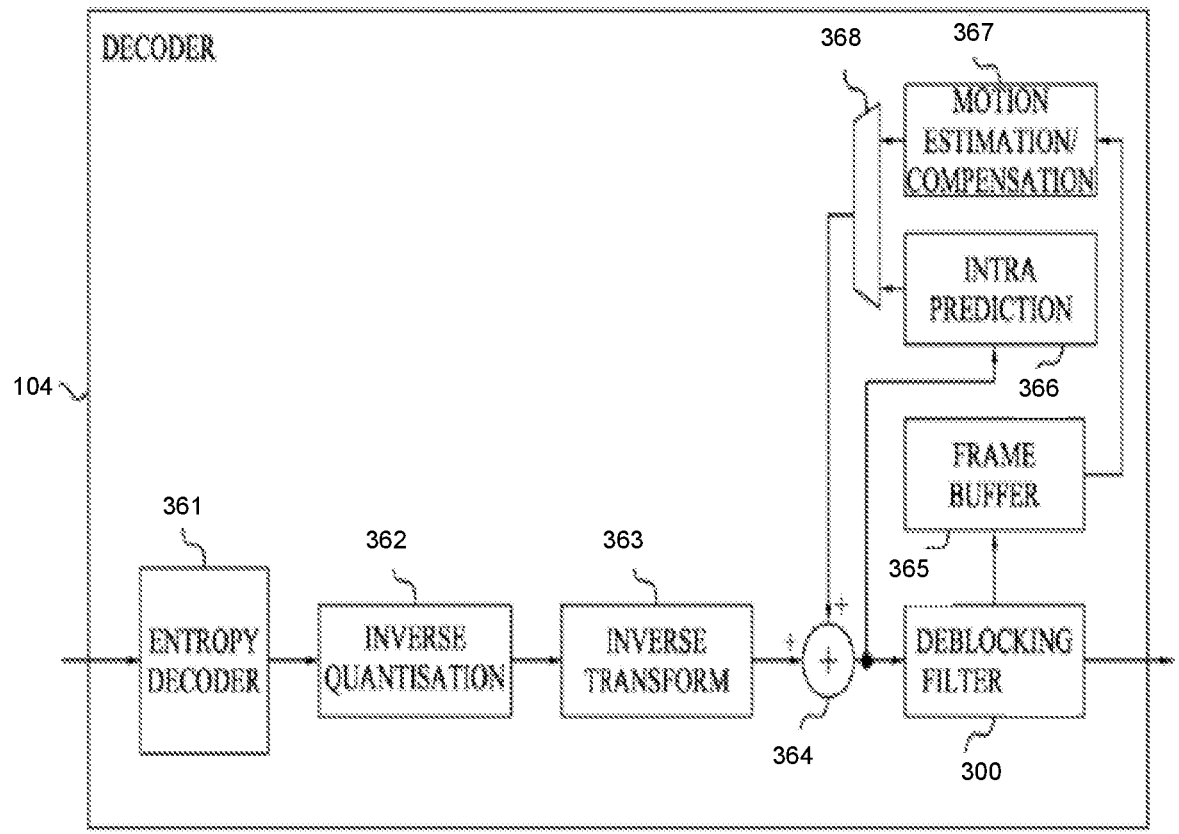
FIG. 3 is a schematic block diagram of a video decoder according to one embodiment.

FIG. 3 is a block diagram of a video decoder 104 according to some embodiments. Decoder 104 includes a decoder 361, such as entropy decoder, to decode an encoded representation of a block of pixels to get a set of quantized and transformed residual errors. These residual errors are dequantized by inverse quantizer 362 and inverse transformed by inverse transformer 363 to provide a set of residual errors. These residual errors are added by adder 364 to the pixel values of a reference block of pixels. The reference block is determined by a motion estimator/compensator 367 or intra predictor 366, depending on whether inter or intra prediction is performed. Selector 368 is thereby interconnected to adder 364 and motion estimator/compensator 367 and intra predictor 366. The resulting decoded block of pixels output form adder 364 is input to deblocking filter 300. The filtered block of pixels is output from decoder 104 and may be furthermore temporarily provided to frame buffer 365 to be used as a reference block of pixels for a subsequent block of pixels to be decoded. Frame buffer 365 is thereby connected to motion estimator/compensator 367 to make the stored blocks of pixels available to motion estimator/compensator 367. The output from adder 364 may also be input to intra predictor 366 to be used as an unfiltered reference block of pixels.

Figure 4:
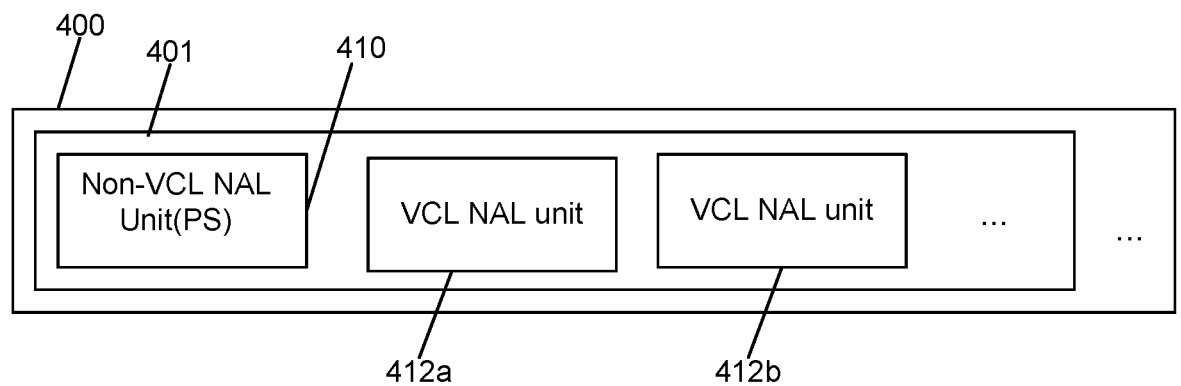
FIG. 4 illustrates an encoded video bitstream according to an embodiment.
Figure 5:
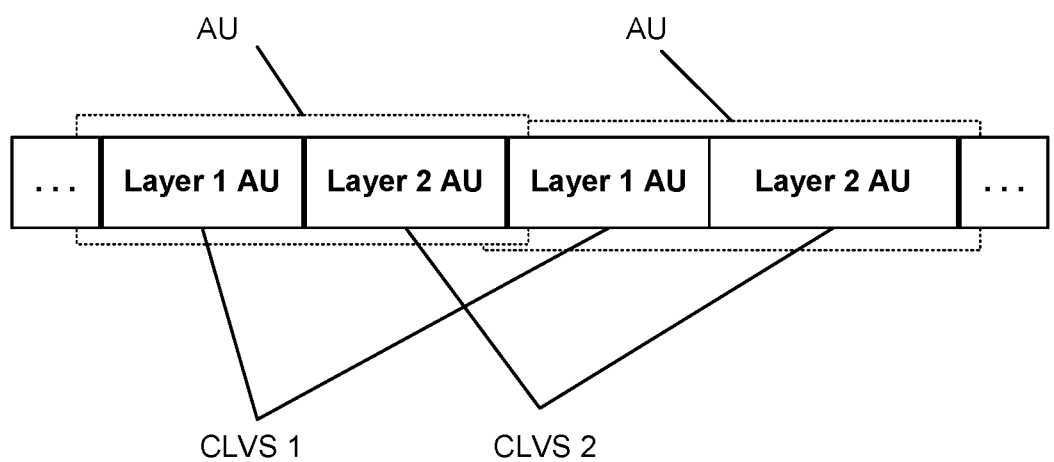
FIG. 5 illustrates a relation between layer access units and coded layer video sequences.
Figure 6:
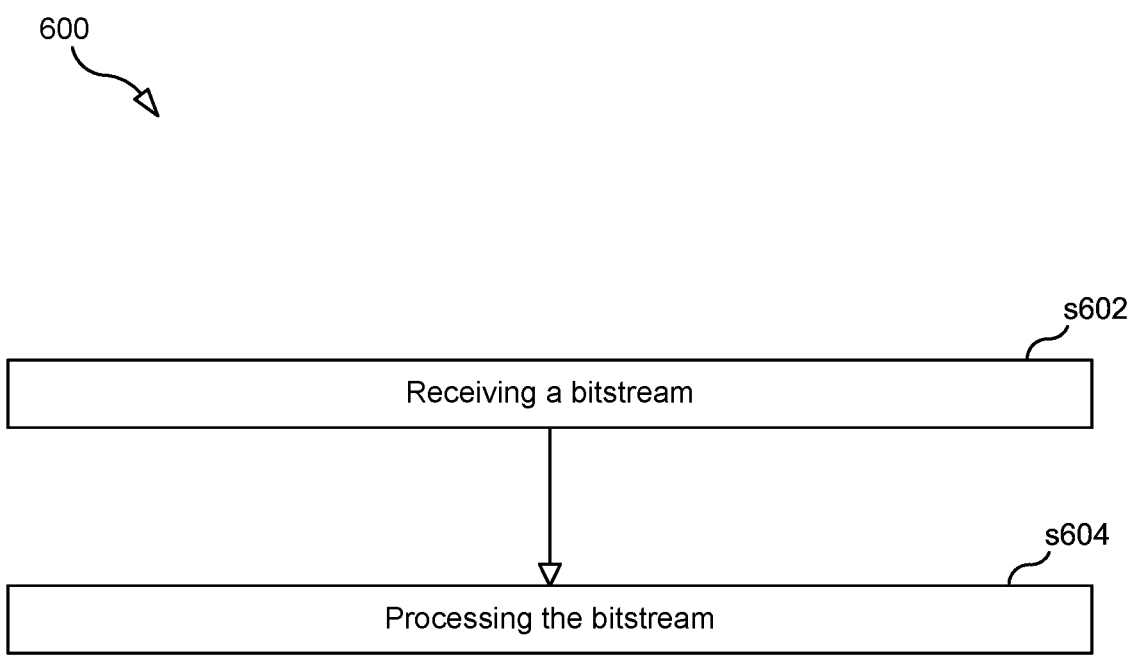
FIG. 6 is a flowchart illustrating a video decoding process according to an embodiment.
Figure 7:
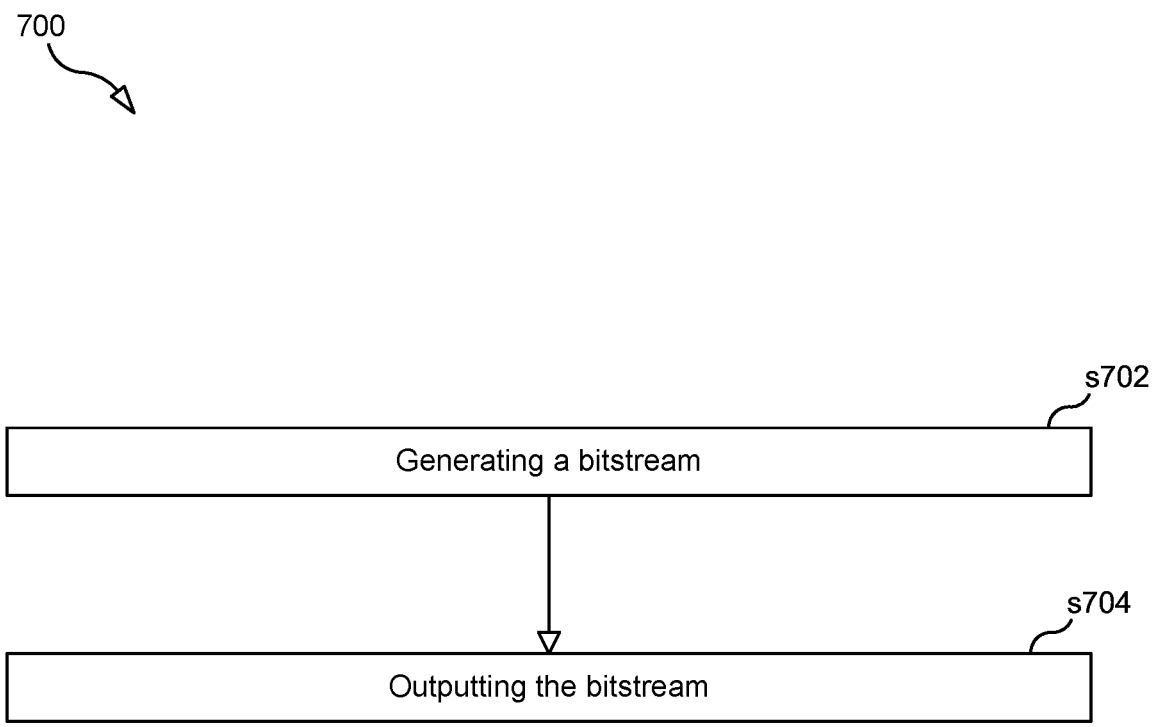
FIG. 7 is a flowchart illustrating a video encoding process according to an embodiment.

FIG. 4 illustrates an example of a portion of a video bitstream 400. The example bitstream portion 400 includes a CVS 401, which comprises a non-VCL NAL unit that contains a parameter set (PS) and a number of VCL NAL units. VCL NAL units 412a and 412b are shown.

The term "segment" in this disclosure is used broadly to encompass not only a NAL unit but also a message (e.g., an SEI message). It is to be understood by a person skilled in the art that the embodiments below may be combined to form solutions that are not explicitly defined, but still covered by this disclosure.

1. Signal Presence of NAL Unit Types and/or SEI Message Types in a Parameter Set In this embodiment a parameter set includes a parameter (a.k.a., codeword) (i.e., a set of one or more bits) that specifies whether a segment of segment type A may be present in the bitstream or not. Thus, the parameter is an example of segment presence information.

In one version of this embodiment the parameter is a flag (i.e., a one bit value) and if the parameter has a first value, e.g. 0, there shall be no segment of segment type A in the bitstream. If the parameter has a second value, e.g., 1, segments of segment type A may be present in the bitstream. This is illustrated with the syntax and semantics below where the parameter is a flag:

TABLE 7

| | Descriptor |
|---|---|
| parameter_set( ) { | |
| ... | |
| segment_type_A_enabled_flag | u(1) |
| ... | |
| } | |
| Semantics: | |
| segment_type_A_enabled_flag equal to 0 specifies that no segment of segment type A shall be present in the bitstream. segment_type_A_enabled_flag equal to 1 specifies that segments of segment type A may be present in the bitstream. When not present, segment_type_A_enabled_flag is inferred to be 1. | |

In another version of this embodiment if the parameter has a first value, e.g. 0, segments of segment type A may be present in the bitstream. If the flag has a second value, e.g. 1, no segment of segment type A shall be present in the bitstream. This is illustrated with the syntax and semantics below where the parameter is a flag:

TABLE 8

| | Descriptor |
|---|---|
| parameter_set( ) { | |
| ... | |
| no_segment_type_A_constraint_flag | u(1) |
| ... | |
| } | |
| Semantics: | |
| no_segment_type_A_constraint_flag equal to 1 specifies that it is a requirement of bitstream conformance that no segment of segment type A shall be present in the bitstream. | |

TABLE 8-continued

Descriptor no_segment_type_A_constraint_flag equal to 0 does not impose a constraint. When not present, no_segment_type_A_constraint_flag is inferred to be 0.

In one version, it is determined by the decoder, based on the parameter value and a segment type of a decoded type, whether the bitstream is valid or invalid. For example, in one embodiment, the decoder will declare the bitstream to be invalid if a segment of type A is present in the bitstream, but the parameter in the parameter set specifies that segments of segment type shall not be present. If it is determined that the bitstream is invalid, the decoder could interpret that as a bit-error or loss of data or that the bitstream and/or encoder is non-compliant and report the error, perform error concealment or take other actions based on the knowledge that the bitstream is not compliant.

A decoder may perform a subset or all of the following steps for this embodiment to decode one or more pictures from a bitstream, where the bitstream comprises at least one parameter set and one or more segments following the parameter set in decoding order, where each segment has a segment type:

1) Decode a value from a codeword in a parameter set in the bitstream (this value is referred to as an "indicator value") and then, based on the indicator value determine whether segments of segment type A in a set of segment types S, may be present in the bitstream, or if segments of a segment type A in a set of segment types S, shall not be present in the bitstream. Thus, the indicator value is an example of segment presence information.
2) Detect in the bitstream the presence of a segment of segment type T (e.g., detect that a codeword in the bitstream indicates that a segment of segment type T is present in the bitstream).
3) Determine based on the indicator value and the decoded segment type T whether the bitstream is valid or invalid.
4) Determine that the bitstream is invalid by determining that segment type T is equal to segment type A and that the indicator value specifies that segments of a segment type A in a set of segment types S shall not be present in the bitstream.
5) If it is determined that the bitstream is invalid, interpret that as a bit-error, loss of data or that the bitstream and/or encoder is non-compliant and report the error, perform error concealment or take other actions based on the knowledge that the bitstream is not compliant.

An encoder may perform a subset or all of the following steps for this embodiment to encode one or more pictures into a bitstream, where the bitstream will comprise at least one parameter set and one or more segments following the parameter set in decoding order, where each segment has a segment type:

1) Encode an indicator value in a codeword in a parameter set in the bitstream, the indicator value specifying whether any segments of segment type A may or shall not be present in the bitstream.
2) If the indicator value specifies that no segment of segment type A shall be present in the bitstream do not include any segments of segment type A in the bitstream, otherwise segments with segment type A may be included in the bitstream.

Alternatively, an encoder may perform a subset or all of the following steps for this embodiment to encode one or more pictures into a bitstream:

1) Retrieve a list of segment types comprising at least one element, the element identifying at least one segment type as not being used in the bitstream.
2) For the at least one segment type in the list identified as not being used, encode an indicator value in a codeword in a parameter set in the bitstream, the indicator value specifying that segments of the segment type not being used shall not be present in the bitstream.
3) In the case that the list contains an element identifying at least one segment type as possibly being used in the bitstream, encode an indicator value to a codeword in a parameter set in the bitstream, the indicator value specifying that segments of the segment type possibly being used may be present in the bitstream.

Alternatively, an encoder may loop over a list of segment types and for each segment type compare the type to a set of segment types that either may be used or will not be used. For the segment types in the list that may be used, the encoder encodes a corresponding codeword in a parameter set using a value specifying that the segment type may be used. For the segment types in the list that will not be used, the encoder encodes a corresponding codeword in a parameter set using a value specifying that the segment type shall not be used.

2. Grouping of Types

In another embodiment, the parameter in the parameter set specifies that a group of segment types may be present or shall not be present in the bitstream where the group comprises at least one type. In one version of this embodiment if the parameter has a first value, e.g. 0, no segment of segment type A, B, . . . , or N shall be present in the bitstream. If the flag has a second value, e.g. 1, segments of segment type A, B, . . . , or N may be present in the bitstream.

Below are example syntax and semantics for this embodiment.

TABLE 9

| | Descriptor |
|---|---|
| parameter_set( ) { | |
| ... | |
|    segment_type_group_enabled_flag | u(1) |
| ... | |
| } | |

Semantics:
segment_type_group_enabled_flag equal to 0 specifies that no segment of segment type A, B, . . . , and N shall be present in the bitstream.
segment_type_group_enabled_flag equal to 1 specifies that segments of segment type A, B, . . . , and N may be present in the bitstream In another version of this embodiment if the parameter has a first value, e.g. 0, segments of segment type A, B, . . . , and N may be present in the bitstream. If the flag has a second value, e.g. 1, no segment of segment type A, B, . . . , and N shall be present in the bitstream. Below are example syntax and semantics for embodiment 2 expanding on the second example of embodiment 1.

TABLE 10

| | Descriptor |
|---|---|
| parameter_set( ) { | |
| ... | |
|    no_segment_type_group_constraint_flag | u(1) |
| ... | |
| } | |

Semantics:
no_segment_type_group_constraint_flag equal to 1 specifies that it is a requirement of bitstream conformance that no segment of segment type A, B, . . . , and N shall be present in the
bitstream. no_segment_type_group_constraint_flag equal to 0 does not impose a constraint.

3. Details for NAL Unit Types

In this embodiment a segment is a NAL unit and it is further described for which NAL unit types the presence may be signaled in a parameter set according to any of the previous embodiments.

Any of the NAL unit types listed in table 11 could potentially have its presence signaled in a parameter set.

Also, any future NAL unit type could potentially also have its presence signaled in a parameter set.

Below are example syntax and semantics of the NAL unit types used in the current version of VVC for which it makes the most sense to signal its presence in the bitstream in a parameter set.

TABLE 11

| | Descriptor |
|---|---|
| parameter_set( ) { | |
| ... | |
|    no_trail_constraint_flag | u(1) |
|    no_stsa_constraint_flag | u(1) |
|    no_rasl_constraint_flag | u(1) |
|    no_radl_constraint_flag | u(1) |
|    no_idr_w_radl_constraint_flag | u(1) |
|    no_idr_n_lp_constraint_flag | u(1) |
|    no_cra_constraint_flag | u(1) |
|    no_gdr_constraint_flag | u(1) |
|    no_aps_constraint_flag | u(1) |
|    no_aud_constraint_flag | u(1) |
|    no_prefix_sei_constraint_flag | u(1) |
|    no_suffix_sei_constraint_flag | u(1) |
| ... | |
| } | |

Semantics:
no_trail_constraint_flag equal to 1 specifies that it is a requirement of bitstream conformance that no NAL unit of NAL unit type TRAIL_NUT shall be present in the bitstream. no_trail_constraint_flag equal to 0 does not impose a constraint.
no_stsa_constraint_flag equal to 1 specifies that it is a requirement of bitstream conformance that no NAL unit of NAL unit type STSA_NUT shall be present in the bitstream. no_stsa_constraint_flag equal to 0 does not impose a constraint.

TABLE 11-continued

| Descriptor |
| --- |
| no_rasl_constraint_flag equal to 1 specifies that it is a requirement of bitstream conformance that no NAL unit of NAL unit type RASL_NUT shall be present in the bitstream. no_rasl_constraint_flag equal to 0 does not impose a constraint.<br>no_radl_constraint_flag equal to 1 specifies that it is a requirement of bitstream conformance that no NAL unit of NAL unit type RADL_NUT shall be present in the bitstream. no_radl_constraint_flag equal to 0 does not impose a constraint.<br>no_idr_w_radl_constraint_flag equal to 1 specifies that it is a requirement of bitstream conformance that no NAL unit of NAL unit type IDR_W_RADL shall be present in the bitstream. no_idr_w_radl_constraint_flag equal to 0 does not impose a constraint.<br>no_idr_n_lp_constraint_flag equal to 1 specifies that it is a requirement of bitstream conformance that no NAL unit of NAL unit type IDR_N_LP shall be present in the bitstream. no_idr_n_lp_constraint_flag equal to 0 does not impose a constraint.<br>no_cra_constraint_flag equal to 1 specifies that it is a requirement of bitstream conformance that no NAL unit of NAL unit type CRA_NUT shall be present in the bitstream. no_cra_constraint_flag equal to 0 does not impose a constraint.<br>no_gdr_constraint_flag equal to 1 specifies that it is a requirement of bitstream conformance that no NAL unit of NAL unit type GDR_NUT shall be present in the bitstream. no_gdr_constraint_flag equal to 0 does not impose a constraint.<br>no_aps_constraint_flag equal to 1 specifies that it is a requirement of bitstream conformance that no NAL unit of NAL unit type APS_NUT shall be present in the bitstream. no_aps_constraint_flag equal to 0 does not impose a constraint.<br>no_aud_constraint_flag equal to 1 specifies that it is a requirement of bitstream conformance that no NAL unit of NAL unit type AUD_NUT shall be present in the bitstream apart from the current access unit. no_aud_constraint_flag equal to 0 does not impose a constraint.<br>no_prefix_sei_constraint_flag equal to 1 specifies that it is a requirement of bitstream conformance that no NAL unit of NAL unit type PREFIX_SEI_NUT shall be present in the bitstream. no_prefix_sei_constraint_flag equal to 0 does not impose a constraint.<br>no_suffix_sei_constraint_flag equal to 1 specifies that it is a requirement of bitstream conformance that no NAL unit of NAL unit type SUFFIX_SEI_NUT shall be present in the bitstream. no_suffix_sei_constraint_flag equal to 0 does not impose a constraint. |

It may be useful for the decoder to know the potential presence or certain absence of the NAL units of the above mentioned NAL unit types for the reasons listed below in table 12:

TABLE 12

| NAL unit type | Example reasons why the decoder would want to know if any NAL units of the NAL unit type may or may not be present in the bitstream |
| --- | --- |
| TRAIL_NUT | If TRAIL and STSA pictures are not present in the bitstream it informs the decoder that there are no trailing pictures in the bitstream. If TRAIL, STSA, RADL, RASL and GDR are not present in the bitstream, the decoder knows that the bitstream is an all-Intra bitstream. |
| STSA_NUT | An STSA picture is a trailing picture at which the decoder may switch up to a higher temporal sublayer which it is currently not decoding. If the decoder decides it wants to up-switch to a higher layer it will need to parse the NAL unit type of each NAL unit header belonging to the temporal sublayer for which the decoder wants to switch up to. Furthermore, the decoder needs to store any PPS and APS NAL units belonging to the temporal sublayer it wants to switch up to.<br>If it is known to the decoder that the bitstream does not contain any STSA pictures, then the decoder cannot switch up and may not need to parse the NAL unit type from the NAL unit headers in any higher temporal sublayers or store any PPS or APS NAL units from higher temporal sublayers. |
| RASL_NUT | If RASL and RADL pictures are not present in the bitstream it informs the decoder that there are no leading pictures in the bitstream. |
| RADL_NUT | If RASL and RADL pictures are not present in the bitstream it informs the decoder that there are no leading pictures in the bitstream. |
| IDR_W_RADL | If IDR and CRA pictures are not present in the bitstream, but GDR pictures may be, it could notify the decoder that the bitstream is low-delay coded. Also, the decoder shall not wait for an IDR or CRA picture to tune in, but tune in on a GDR picture. |
| IDR_N_LP | If IDR and CRA pictures are not present in the bitstream, but GDR pictures may be, it could notify the decoder that the bitstream is low-delay coded. Also, the decoder shall not wait for an IDR or CRA picture to tune in, but tune in on a GDR picture. |

TABLE 12-continued

| | |
|---|---|
| CRA_NUT | If CRA pictures are not present in the bitstream it could notify the decoder that the bitstream is low-delay coded. |
| GDR_NUT | If the decoder knows that there are no GDR pictures in the bitstream, the decoder does not need to generate any unavailable pictures to decode the stream (It is well known that CRA random access can be done without generating unavailable pictures since any RASL picture is discarded) If the decoder knows that there are no IDR, CRA or GDR (or DRAP) pictures in the bitstream, it knows it cannot perform a random-access operation and does not need to scan a bitstream for random access pictures. |
| APS_NUT | If the decoder knows that there will be no APSs it does not need to allocate memory to store any potential APSs. |
| AUD_NUT | If the decoder knows that only the first access unit (i.e. the current access unit) has an AUD, it knows it does not need to wait for the next AUD before it finalizes the access unit being decoded. |
| PREFIX_SEI_NUT | If the decoder knows that there are no prefix SEI messages in the bitstream it knows it cannot expect any prefix supplemental enhancement information in the bitstream. |
| SUFFIX_SEI_NUT | If the decoder knows that there are no suffix SEI messages in the bitstream it knows it cannot expect any suffix supplemental enhancement information in the bitstream. |

In an alternative version, some of the NAL unit types described above are grouped. This is further exemplified by the syntax and semantics below:

4. Details for Types of SEI Messages

In this embodiment the segment is a SEI message and it is further described for which types of SEI messages the

TABLE 13

| | Descriptor |
|---|---|
| parameter_set( ) { | |
| ... | |
|   no_trailing_pics_constraint_flag | u(1) |
|   no_leading_pics_constraint_flag | u(1) |
|   no_idr_constraint_flag | u(1) |
|   no_irap_constraint_flag | u(1) |
|   no_rap_constraint_flag | u(1) |
|   no_sei_messages_constraint_flag | u(1) |
| ... | |
| } | |

Semantics:
no_trailing_pics_constraint_flag equal to 1 specifies that it is a requirement of bitstream conformance that no NAL unit of NAL unit type TRAIL_NUT or STSA_NUT shall be present in the bitstream. no_trailing_pics_constraint_flag equal to 0 does not impose a constraint.
no_leading_pics_constraint_flag equal to 1 specifies that it is a requirement of bitstream conformance that no NAL unit of NAL unit type RASL_NUT or RADL_NUT shall be present in the bitstream. no_leading_pics_constraint_flag equal to 0 does not impose a constraint.
no_idr_constraint_flag equal to 1 specifies that it is a requirement of bitstream conformance that no NAL unit of NAL unit type IDR_W_RADL or IDR_N_LP shall be present in the bitstream. no_idr_constraint_flag equal to 0 does not impose a constraint.
no_irap_constraint_flag equal to 1 specifies that it is a requirement of bitstream conformance that no NAL unit of NAL unit type IDR_W_RADL, IDR_N_LP or CRA_NUT shall be present in the bitstream. no_irap_constraint_flag equal to 0 does not impose a constraint.
no_rap_constraint_flag equal to 1 specifies that it is a requirement of bitstream conformance that no NAL unit of NAL unit type IDR_W_RADL, IDR_N_LP, CRA_NUT or GRA_NUT shall be present in the bitstream, except for the current access unit. no_rap_constraint_flag equal to 0 does not impose a constraint.
no_sei_messages_constraint_flag equal to 1 specifies that it is a requirement of bitstream conformance that no NAL unit of NAL unit type PREFIX_SEI_NUT or SUFFIX_SEI_NUT shall be present in the bitstream. no_sei_messages_constraint_flag equal to 0 does not impose a constraint.
Alternative semantics for no_idr_constraint_flag and no_irap_constraint_flag may be as follows:
no_idr_constraint_flag equal to 1 specifies that it is a requirement of bitstream conformance that no NAL unit of NAL unit type IDR_W_RADL or IDR_N_LP shall be present in the bitstream, except for the current access unit. no_idr_constraint_flag equal to 0 does not impose a constraint.
no_irap_constraint_flag equal to 1 specifies that it is a requirement of bitstream conformance that no NAL unit of NAL unit type IDR_W_RADL, IDR_N_LP or CRA_NUT shall be present in the bitstream, except for the current access unit.
no_irap_constraint_flag equal to 0 does not impose a constraint.

presence may be signaled in a parameter set according to any of the previous embodiments.

Any of the SEI message types listed in table 14 or any of the SEI messages defined in HEVC could potentially have their presence signaled in a parameter set. Also, any future SEI message type, where some may be copied from HEVC, could potentially have its presence signaled in a parameter set.

Below are example syntax and semantics for two of the SEI message types in the current version of VVC:

TABLE 14

|  | Descriptor |
|---|---|
| parameter_set( ) { | |
| ... | |
| no_decoded_picture_hash_sei_constraint_flag | u(1) |
| no_dependent_rap_indication_sei_constraint_flag | u(1) |
| ... | |
| } | |

Semantics:
no_decoded_picture_hash_sei_constraint_flag equal to 1 specifies that it is a requirement of bitstream conformance that no decoded picture hash SEI message shall be present in the bitstream. no_decoded_picture_hash_sei_constraint_flag equal to 0 does not impose a constraint.
no_dependent_rap_indication_sei_constraint_flag equal to 1 specifies that it is a requirement of bitstream conformance that no dependent random access point (DRAP) indication SEI message shall be present in the bitstream.
no_dependent_rap_indication_sei_constraint_flag equal to 0 does not impose a constraint.

It may be useful for a decoder to know that there are no DRAP SEI messages in the bitstream. For instance, if the decoder wants to be able to tune into a separate channel which it is currently not decoding, it could do so if DRAP pictures were present, store the most recent IRAP picture to be able to tune in faster at the DRAP pictures. But if the decoder knows that DRAP pictures are not present in the bitstream, the decoder would not need to store the most recent IRAP pictures of the separate channel, but could just wait for the next IRAP picture when it wants to tune in.

In an alternative version the parameter set may include a no_rap_constraint_flag parameter having the following semantics:

no_rap_constraint_flag equal to 1 specifies that it is a requirement of bitstream conformance that no NAL unit of NAL unit type IDR_W_RADL, IDR_N_LP, CRA_NUT or GRA_NUT shall be present in the bitstream, except for the current access unit. It is further a requirement of bitstream conformance that no dependent random access point indication SEI message shall be present in the bitstream. no_rap_constraint_flag equal to 0 does not impose a constraint.

5. Details for Parameter Sets

In this embodiment it is further defined what the parameter set may be, in which the presence of the segment type in the bitstream is signaled.

In one version, the parameter set is a DPS. In another version the parameter set is a VPS. In one version the presence of the segment type is signaled in a general_constraint_info( ) struct which in the current version of VVC may be present in both a DPS and a VPS. In two other versions the parameter set is a SPS or a PPS, respectively. In yet another version the parameter set is an entity, box or field signaled at the systems layer, specified in e.g. DVB, ATSC, ISOBMFF, DASH or MMT.

6. Signal which Temporal Sublayers May Have the NAL Unit Types

In one embodiment, the parameter set identifies one or more temporal sublayers in which a segment with segment type A may be present or shall not be present. For instance, in one example, the parameter set indicates that NAL units with NAL unit type A (e.g., STSA_NUT) may only be present in temporal sublayer 1 in the bitstream and shall not be present in temporal sublayers higher than 1.

7. Signal which Layers (e.g. Scalable Layers) May Have the NAL Unit Types

In one embodiment, the parameter set identifies one or more layers in which a segment with segment type A may be present or shall not be present. For instance, in one example, the parameter set indicates that NAL units with NAL unit type A (e.g., STSA_NUT) may only be present in layers 0, 4, and 34 in the bitstream and shall not be present in layers 5, 7 and 23 in the bitstream.

8. Third Party Specification Mandates that the Parameter Should or Shall Have a Specified Value.

In another embodiment, a third party specification (e.g DVB or ATSC) mandates that the parameter that indicates the presence of the segment type and is signaled in the parameter set, should or shall have a specified value. For instance, DVB or ATSC may specify that no_gdr_constraint_flag shall have the value 1. This may mean that no NAL unit of NAL unit type GDR_NUT shall be present in the bitstream.

9. Bitstream and Scope of Parameter.

In one embodiment, the term bitstream refers to the portion of the entire bitstream in which the segments refer to a parameter set that contains the parameter. In HEVC and VVC the entire bitstream may be a continuous series of one or more CVSs followed by an end-of-bitstream NAL unit. For example, if the parameter is present in the DPS or VPS, the bitstream may comprise only those CVSs that refer to the DPS or VPS, respectively, that contains the parameter.

In another embodiment, the parameter is present in the SPS and the bitstream comprises only the single CVS that refers to that SPS. Alternatively, the bitstream in this case consists of those CVSs that refer to either the DPS or VPS to which the SPS refers.

In other embodiments, the parameter is present in the PPS and the bitstream consists of one of the following: 1) those segments (or NAL units) that refer to that PPS; 2) the CVS in which the PPS is present or activated; 3) those CVSs that refer to the DPS to which the PPS refers; 4) those CVSs that refer to the VPS to which the PPS refers.

The term "bitstream" in this disclosure may have any of the meanings explained in the embodiments above.

10. Overwritten

In another embodiment the indicator value may change in a future part of the entire bitstream such that for instance the indicator indicates that a certain NAL unit type may be present in part of the bitstream and that certain NAL unit type may not be present in a later part of the bitstream. In this embodiment the indicator value is applied to a part of the bitstream until the indicator is over written or set to a new value and from that point in the bitstream the new value of the indicator is applied.

In a variant of this embodiment the indicator values may be overwritten in a sub-bitstream extract or merge process such that the resulting bitstream may have or may not have one or a group of certain NAL unit types and the indicator values in the resulting bitstream may be defined based on the indicator value or values in the original bitstream or bitstreams.

11. Multi Value Indicator

In another embodiment an indicator value may be determined from a set of two or more bits (i.e., have more than two values such as three values). For example, in cases where the indicator value is determined by decoding two or more bits included in the parameter set, the indicator value can have any one of the following values: 0, 1, 2, and 3. One such indicator value (e.g., 0) may indicate that a certain NAL unit type may be present in the bitstream, another such value (e.g., 1) may indicate that the certain NAL unit type may not be present in the bitstream, and a third such value (e.g., 2) may indicate that a certain NAL unit type shall be present in the bitstream.

12. Conditional Indicators

In another embodiment a first set of one or more bits (e.g., a one bit flag), is signaled in a parameter set and the value of this first set of bits together with the value or values of one or more other parameters in the same parameter set or other parameter sets in the bitstream specify whether a segment of segment type A may be present in the bitstream or not. In one example, the indicator specifies whether a segment of segment type A may exist in the bitstream only if the value of the parameter P in the SPS is equal to 1.

Figure 8:
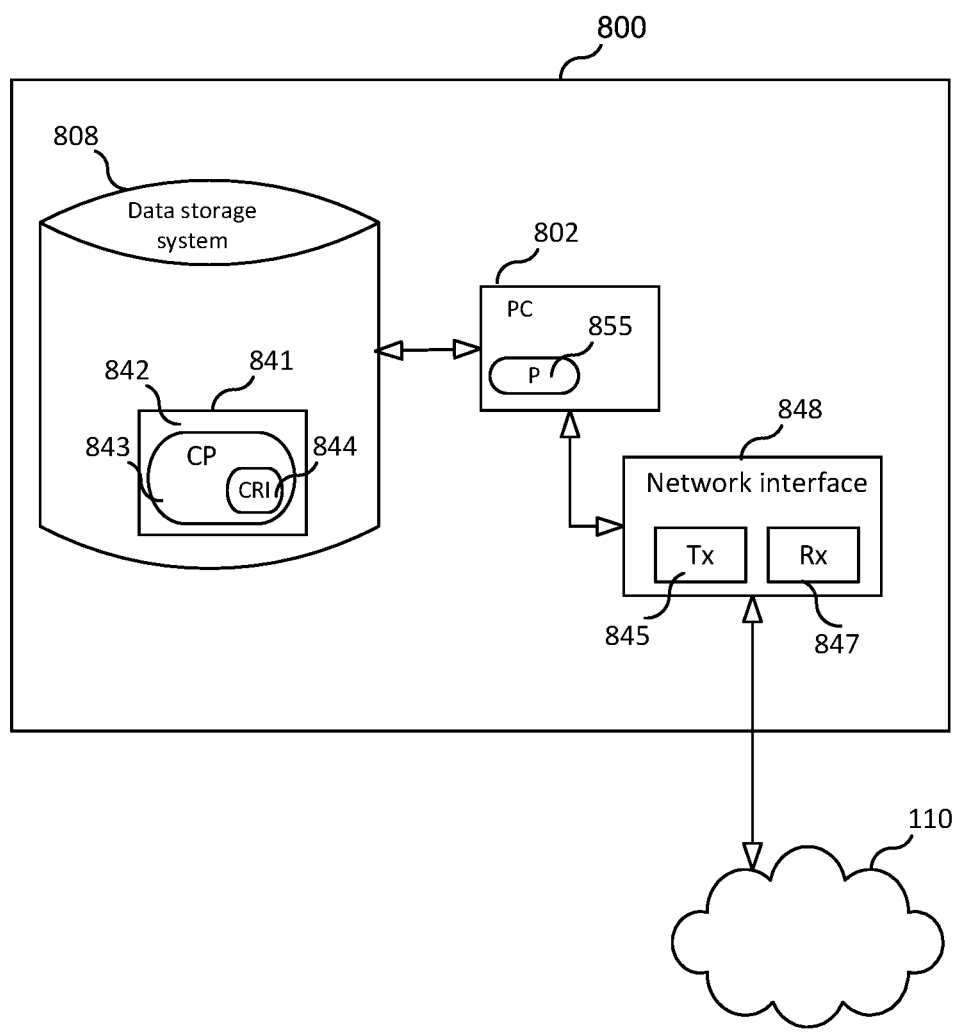
FIG. 8 is a block diagram of an apparatus according to an embodiment.

FIG. 8 is a block diagram of an apparatus 800, according to some embodiments, for implementing the video encoder 102 or the video decoder 104. That is, apparatus 800 is operative to perform process 600 and/or process 700. In embodiments where apparatus 800 implements video encoder 102, apparatus 800 may be referred to as an "encoding apparatus 800," and in embodiments where apparatus 800 implements video decoder 104, apparatus 800 may be referred to as a "decoding apparatus 800." As shown in FIG. 8, apparatus 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 800 may be a distributed computing apparatus); a network interface 848 comprising a transmitter (Tx) 845 and a receiver (Rx) 847 for enabling apparatus 800 to transmit data to and receive data from other nodes connected to a network 110 (e.g., an Internet Protocol (IP) network) to which network interface 848 is connected (directly or indirectly) (e.g., network interface 848 may be wirelessly connected to the network 110, in which case network interface 848 is connected to an antenna arrangement); and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes apparatus 800 to perform steps described herein (e.g., steps described herein with reference to the flow charts). In other embodiments, apparatus 800 may be configured to perform steps described herein without the need for code. That is, for example, PC 802 may consist merely of one or more ASICs. Hence, the features of the embodiments described herein may be implemented in hardware and/or software.

While various embodiments are described herein (including the Appendix), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

| Abbreviation | Explanation |
| --- | --- |
| ATSC | Advanced Television Systems Comitee |
| AU | Access Unit |
| AUD | Access Unit Delimiter |
| ALF | Adaptive Loop Filter |
| APS | Adaptive Parameter Set |
| BLA | Broken Link Access |
| CLVS | Coded Layer Video Sequence |
| CRA | Clean Random Access |
| CVS | Coded Video Stream |
| CVSS | CVS Start |
| CU | Coding Unit |
| DASH | Dynamic Adaptive Streaming over HTTP |
| DPS | Decoding Parameter Set |
| DVB | Digital Video Broadcasting |
| DRAP | Dependent Random Access Point |
| GDR | Gradual Decoding Refresh |
| HEVC | High-Efficiency Video Coding |
| IDR | Instantaneous Decoding Refresh |
| IRAP | Intra Random Access Point |
| ISO | International Standardization Organization |
| ISOBMFF | ISO Base Media File Format |
| LMCS | Luma Mapping and Chroma Scaling |
| MPEG | Motion Picture Experts Group |
| MMT | MPEG Media Transport |
| NAL | Network Abstraction Layer |
| NALU | NAL unit |
| NUT | NAL unit type |
| PPS | Picture Parameter Set |
| RADL | Random Access Decodable Leading |
| RAP | Random Access Point |
| RASL | Random Access Skipped Leading |
| RBSP | Raw Byte Sequence Payload |
| RPL | Reference Picture List |

-continued

| Abbreviation | Explanation |
|---|---|
| SEI | Supplemental Enhancement layer |
| SPS | Sequence Parameter Set |
| STSA | Step-wise Temporal Layer Access |
| VCL | Video Coding Layer |
| VPS | Video Parameter Set |
| VVC | Versatile Video Coding |

Appendix

The following text is from a contribution that proposes changes to the current version of VVC.
Begin Text
Abstract This contribution proposes to signal the potential presence of some of the NAL unit types in the bitstream in the general_constraint_info( ) struct in DPS and VPS. In addition it is also proposed to signal the potential presence of DRAP pictures in the bitstream in the general_constraint_info( ) struct. In a first option the following constraint flags are proposed:
    no_trail_constraint_flag
    no_stsa_constraint_flag
    no_rasl_constraint_flag
    no_radl_constraint_flag
    no_idr_constraint_flag
    no_cra_constraint_flag
    no_gdr_constraint_flag
    no_aps_constraint_flag
    no_dependent_rap_indication_sei_constraint_flag In a second slimmer option constraint flags are only proposed for the NAL units and picture types the proponents assess it would be most useful for. Another difference compared to the first option is that the no_idr_constraint_flag and the no_cra_constraint_flag are grouped into a no_irap_constraint_flag. The following constraint flags are proposed in the second option:
    no_stsa_constraint_flag
    no_irap_constraint_flag
    no_gdr_constraint_flag
    no_aps_constraint_flag
    no_dependent_rap_indication_sei_constraint_flag It is proposed to add one of option 1 or option 2 to the VVC specification, or a mixture of the two.
1 Introduction The current version of VVC provides signaling a set of constraints in the general_constraint_info( ) struct in DPS and/or VPS. The constraints inform the decoder what to expect from the bitstream, including if certain coding tools are enabled in the bitstream or not, the maximum bitdepth and chroma format for the bitstream, etc. Given these restrictions, the decoder may then adapt the allocation and usage of resources. However, these constraints do not include any information about which NAL unit types that may be expected in the bitstream. Below are some examples when it may be useful for the decoder to know that certain NAL unit types will not be present in the bitstream:

If it is known that no STSA pictures will be present in the bitstream, the decoder does not need to scan higher temporal sublayers than what it is currently decoding, and does not need to store any PPSs or APSs in the higher sublayers that may otherwise be needed when switching up at an STSA picture.

If it is known that no CRA or IDR pictures will be present in the bitstream, except for the first access unit, the decoder may conclude that there may not be any bitrate spikes from IRAP pictures and may adapt its output timing accordingly.

If it is known that no GDR pictures will be present in the bitstream, the decoder does not need to generate any unavailable pictures to decode the stream (It is well known that CRA random access can be done without generating unavailable pictures since any RASL picture is discarded).

If it is known that there will be no APSs in the bitstream, the decoder does not need to allocate memory to store any potential APSs.

It may be useful for a decoder to know that there are no DRAP SEI messages in the bitstream. For instance, if the decoder wants to be able to switch from one broadcasted channel to another which it is currently not decoding, it could if DRAP pictures were present, store the most recent IRAP picture of the other channel to be able to tune in faster at a following DRAP picture. When switching, the decoder would first decode the stored IRAP picture, followed by the DRAP picture and then the following pictures. But if the decoder knows that DRAP pictures shall not be present in the bitstream, the decoder would not need to store the most recent IRAP pictures of the separate channel but would have to wait for the next IRAP picture when it wants to switch to the other channel 2 Proposal It is proposed to signal the potential presence of some of the NAL unit types in the bitstream in the general_constraint_info( ) struct in DPS and VPS. In addition it is also proposed to signal the potential presence of DRAP pictures in the bitstream in the general_constraint_info( ) struct. In a first option the following constraint flags are proposed:
    no_trail_constraint_flag
    no_stsa_constraint_flag
    no_rasl_constraint_flag
    no_radl_constraint_flag
    no_idr_constraint_flag
    no_cra_constraint_flag
    no_gdr_constraint_flag
    no_aps_constraint_flag
    no_dependent_rap_indication_sei_constraint_flag In a second slimmer option constraint flags are only proposed for the NAL units and picture types the proponents assessed it would be most useful for. Another difference compared to the first option is that the no_idr_constraint_flag and the no_cra_constraint_flag are grouped into a no_irap_constraint_flag. The following constraint flags are proposed in the second option:
    no_stsa_constraint_flag
    no_irap_constraint_flag
    no_gdr_constraint_flag
    no_aps_constraint_flag
    no_dependent_rap_indication_sei_constraint_flag It is proposed to add one of option 1 or option 2 to the VVC specification, or a mixture of the two.
2.1 Proposed Changes to the VVC Specification The proposed changes on top of the current VVC draft (JVET-O2001vE) for option 1 and option 2 are shown below.

2.1.1 Option 1

| | Descriptor |
|---|---|
| general_constraint_info( ) { | |
| ... | |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| no_dependent_rap_indication_sei_constraint_flag | u(1) |
| ... | |
| } | | no_trail_constraint_flag equal to 1 specifies that it is a requirement of bitstream conformance that no NAL unit of NAL unit type TRAIL_NUT shall be present in the bitstream. no_trail_constraint_flag equal to 0 does not impose a constraint.

no_stsa_constraint_flag equal to 1 specifies that it is a requirement of bitstream conformance that no NAL unit of NAL unit type STSA_NUT shall be present in the bitstream. no_stsa_constraint_flag equal to 0 does not impose a constraint.

no_rasl_constraint_flag equal to 1 specifies that it is a requirement of bitstream conformance that no NAL unit of NAL unit type RASL_NUT shall be present in the bitstream. no_rasl_constraint_flag equal to 0 does not impose a constraint.

no_radl_constraint_flag equal to 1 specifies that it is a requirement of bitstream conformance that no NAL unit of NAL unit type RADL_NUT shall be present in the bitstream. no_radl_constraint_flag equal to 0 does not impose a constraint.

no_idr_constraint_flag equal to 1 specifies that it is a requirement of bitstream conformance that no NAL unit of NAL unit type IDR_W_RADL or IDR_N_LP shall be present in the bitstream, except for the current access unit. no_idr_constraint_flag equal to 0 does not impose a constraint.

no_cra_constraint_flag equal to 1 specifies that it is a requirement of bitstream conformance that no NAL unit of NAL unit type CRA_NUT shall be present in the bitstream. no_cra_constraint_flag equal to 0 does not impose a constraint.

no_gdr_constraint_flag equal to 1 specifies that it is a requirement of bitstream conformance that no NAL unit of NAL unit type GDR_NUT shall be present in the bitstream. no_gdr_constraint_flag equal to 0 does not impose a constraint.

no_aps_constraint_flag equal to 1 specifies that it is a requirement of bitstream conformance that no NAL unit of NAL unit type APS_NUT shall be present in the bitstream. no_aps_constraint_flag equal to 0 does not impose a constraint.

no_dependent_rap_indication_sei_constraint_flag equal to 1 specifies that it is a requirement of bitstream conformance that no dependent random access point indication SEI message shall be present in the bitstream. no_dependent_rap_indication_sei_constraint_flag equal to 0 does not impose a constraint.

2.1.2 Option 2—Slim Version

| | Descriptor |
|---|---|
| general_constraint_info( ) { | |
| ... | |
| no_stsa_constraint_flag | u(1) |
| no_irap_constraint_flag | u(1) |
| no_gdr_constraint_flag | u(1) |
| no_aps_constraint_flag | u(1) |
| no_dependent_rap_indication_sei_constraint_flag | u(1) |
| ... | |
| } | | no_stsa_constraint_flag equal to 1 specifies that it is a requirement of bitstream conformance that no NAL unit of NAL unit type STSA_NUT shall be present in the bitstream. no_stsa_constraint_flag equal to 0 does not impose a constraint.

no_irap_constraint_flag equal to 1 specifies that it is a requirement of bitstream conformance that no NAL unit of NAL unit type IDR_W_RADL, IDR_N_LP or CRA_NUT shall be present in the bitstream, except for the current access unit. no_irap_constraint_flag equal to 0 does not impose a constraint.

no_gdr_constraint_flag equal to 1 specifies that it is a requirement of bitstream conformance that no NAL unit of NAL unit type GDR_NUT shall be present in the bitstream. no_gdr_constraint_flag equal to 0 does not impose a constraint.

no_aps_constraint_flag equal to 1 specifies that it is a requirement of bitstream conformance that no NAL unit of NAL unit type APS_NUT shall be present in the bitstream. no_aps_constraint_flag equal to 0 does not impose a constraint.

no_dependent_rap_indication_sei_constraint_flag equal to 1 specifies that it is a requirement of bitstream conformance that no dependent random access point indication SEI message shall be present in the bitstream. no_dependent_rap_indication_sei_constraint_flag equal to 0 does not impose a constraint.

End Text

The invention claimed is:

1. A method performed by a decoder, the method comprising:
 receiving a bitstream, wherein the bitstream comprises a first part; and
 decoding, from the first part of the bitstream, Network Abstraction Layer (NAL) unit presence information from general constraint information syntax elements in one or more parameter sets, the one or more parameter sets comprising a first parameter set, the first parameter set being a decoder parameter set (DPS), a video parameter set (VPS), an sequence parameter set (SPS), or a picture parameter set (PPS), wherein
 the NAL unit presence information indicates i) that at least NAL units of a first NAL unit type shall not be present in at least a portion of the bitstream or ii) that at least NAL units of a first NAL unit type may be present in at least the portion of the bitstream, and
 the NAL units of the first NAL unit type are video coding layer (VCL) NAL units or comprise one of adaptation parameter set (APS) NAL units or access unit delimiter (AUD) NAL units.

2. The method of claim 1, further comprising:
- determining that the NAL unit presence information indicates that NAL units of the first NAL unit type shall not be present in at least the portion of the bitstream;
- detecting that the portion of the bitstream contains a NAL unit of the first NAL unit type; and
- as a result of the determining and the detecting, declaring that at least the portion of the bitstream is invalid.

3. The method of claim 1, wherein the NAL unit presence information indicates one of:
- i) a temporal sublayer value or range of values for which the portion of the bitstream shall not contain any NAL units of the first NAL unit type, or
- ii) the temporal sublayer value or range of values for which the portion of the bitstream may contain NAL units of the first NAL unit type, and wherein the method further comprises:
- determining that the NAL unit presence information indicates the temporal sublayer value or range of values for which the portion of the bitstream shall not contain any NAL units of the first NAL unit type;
- detecting that a temporal sublayer identified by the temporal sublayer value or range of values contains a NAL unit of the first NAL unit type; and
- as a result of the determining and the detecting, declaring the portion of the bitstream is invalid.

4. The method of claim 1, wherein the NAL unit presence information indicates one of:
- i) a layer value or range of values for which the portion of the bitstream shall not contain any NAL units of the first NAL unit type, or
- ii) the layer value or range of values for which the portion of the bitstream may contain NAL units of the first NAL unit type.

5. The method of claim 4, wherein the method further comprises:
- determining that the NAL unit presence information indicates the layer value or range of values for which the portion of the bitstream shall not contain any NAL units of the first NAL unit type;
- detecting that a layer identified by the layer value or range of values contains a NAL unit of the first NAL unit type;
- and as a result of the determining and the detecting, declaring the portion of the bitstream is invalid.

6. The method of claim 1, wherein
the first part of the bitstream comprises a first parameter set and a second parameter set,
the method further comprising determining a first value based on information included in the first parameter set and determining a second value based on information included in the second parameter set, and
the NAL unit presence information comprises the first value and the second value.

7. The method of claim 1, wherein
the first part of the bitstream comprises a first parameter set,
the method further comprising determining a first value based on information included in the first parameter set and determining a third value based on information included in the first parameter set, and
the NAL unit presence information comprises the first value and the third value.

8. The method of claim 1, wherein
the first part of the bitstream consists of a first parameter set, and
the first parameter set comprises a set of bits, and the set of bits included in the first parameter set provides the NAL unit presence information, wherein the set of bits consists of a single bit or a sequential set of bits in the first parameter set.

9. The method of claim 8, wherein the first parameter set is an entity signaled at a systems layer.

10. The method of claim 8, wherein the portion of the bitstream consists of NAL units that refer to the first parameter set.

11. The method of claim 1, wherein the bitstream is a continuous series of one or more CVSs and wherein:
- the first parameter set is a DPS or VPS, and the portion of the bitstream comprises only those CVSs that refer to the first parameter set; or
- the first parameter set is a SPS, and the portion of the bitstream comprises only the single CVS that refers to the SPS; or
- the first parameter set is a SPS that refers to a second parameter set, and the portion of the bitstream comprises only those CVSs that refer to the second parameter set to which the SPS refers.

12. The method of claim 1, wherein the VCL NAL units comprise one of TRAIL NAL units, STSA NAL units, RASL NAL units, RADL NAL units, IDR NAL units, CRA NAL units and GDR NAL units.

13. The method of claim 1, wherein the NAL unit type is one of TRAIL_NUT, STSA_NUT, RASL_NUT, RADL_NUT, IDR_W_RADL, IDR_N_LP, CRA_NUT, GDR_NUT, APS_NUT or AUD_NUT.

14. The method of claim 1, wherein decoding the NAL unit presence information from the first part of the bitstream comprises:
- decoding an indicator value from a syntax element in the first part of the bitstream;
- responsive to the indicator value being equal to a first value, the NAL unit presence information indicates that at least NAL units of a first NAL unit type shall not be present in at least a portion of the bitstream; and
- responsive to the indicator value being equal to a second value, the NAL unit presence information indicates that at least NAL units of the first NAL unit type may be present in at least the portion of the bitstream.

15. A non-transitory computer readable medium storing a computer program comprising instructions which when executed by processing circuitry causes the processing circuitry to perform the method of claim 1.

16. A decoding apparatus, the decoding apparatus comprising:
- memory;
- a receiver for receiving a bitstream, wherein the bitstream comprises a first part; and
- processing circuitry coupled to the memory, wherein the decoding apparatus is configured to:
  - decode, from the first part of the bitstream, a network abstraction layer (NAL) unit presence information from general constraint information syntax elements in one or more parameter sets, the one or more parameter sets comprising a first parameter set, the first parameter set being a decoder parameter set (DPS), a video parameter set (VPS), an sequence parameter set (SPS), or a picture parameter set (PPS), wherein
  - the NAL unit presence information indicates i) that at least NAL units of a first NAL unit type shall not be present in at least a portion of the bitstream or ii) that at least NAL units of a first NAL unit type may be present in at least the portion of the bitstream, and the NAL units of the first NAL unit type are video coding layer (VCL) NAL units or comprise one of adaptation parameter set (APS) NAL units or access unit delimiter (AUD) NAL units.

17. A method performed by an encoder, the method comprising:
generating a bitstream; and
outputting the bitstream, wherein
the bitstream comprises a first part,
the first part of the bitstream comprises a first parameter set, the first parameter set being a decoder parameter set (DPS), a video parameter set (VPS), an sequence parameter set (SPS), or a picture parameter set (PPS) comprising general constraint information syntax elements providing network abstraction layer (NAL) unit presence information,
the NAL unit presence information indicates i) that at least NAL units of a first NAL unit type shall not be present in at least a portion of the bitstream or ii) that at least NAL units of a first NAL unit type may be present in at least the portion of the bitstream, and
the NAL units of the first NAL unit type are video coding layer (VCL) NAL units or comprise one of adaptation parameter set (APS) NAL units or access unit delimiter (AUD) NAL units.

18. An encoding apparatus comprising:
memory; and
processing circuitry coupled to the memory, wherein the encoding apparatus is configured to:
generate a bitstream; and
output the bitstream, wherein
the bitstream comprises a first part,
the first part of the bitstream comprises a first parameter set, the first parameter set being a decoder parameter set (DPS), a video parameter set (VPS), an sequence parameter set (SPS), or a picture parameter set (PPS) comprising general constraint information syntax elements providing NAL unit presence information,
the NAL unit presence information indicates i) that at least NAL units of a first NAL unit type shall not be present in at least a portion of the bitstream or ii) that at least NAL units of a first NAL unit type may be present in at least the portion of the bitstream, and
the NAL units of the first NAL unit type are video coding layer (VCL) NAL units or comprise one of adaptation parameter set (APS) NAL units or access unit delimiter (AUD) NAL units.

* * * * *